United States Patent [19]

Rodriguez

[11] Patent Number: 5,116,390
[45] Date of Patent: May 26, 1992

[54] CATALYTICALLY ENHANCED COMBUSTION PROCESS

[76] Inventor: Carlos Rodriguez, Belmont House, 10 Princes Road, Douglas, Isle of Man, Isle of Man

[21] Appl. No.: 293,813

[22] Filed: Jan. 5, 1989

Related U.S. Application Data

[63] Continuation of Ser. No. 898,619, Aug. 21, 1986, abandoned.

[51] Int. Cl.5 ............................ C10L 1/18; C10L 1/02
[52] U.S. Cl. .......................................... 44/300; 44/302
[58] Field of Search ................ 44/53, 56, 57, 78, 302, 44/300; 252/52

[56] References Cited

U.S. PATENT DOCUMENTS

| | | | |
|---|---|---|---|
| 313,795 | 3/1885 | Zimmerling | 44/56 |
| 1,419,910 | 10/1917 | Backhaus | 44/56 |
| 1,474,982 | 11/1923 | Schreiber | 44/56 |
| 1,570,161 | 1/1926 | McKee | 44/56 |
| 1,587,899 | 6/1926 | Carroll et al. | 44/56 |
| 1,820,395 | 8/1931 | Lovell et al. | 44/78 |
| 2,088,000 | 7/1937 | Savage | 44/56 |
| 3,925,031 | 12/1975 | Villacampa | 44/56 |

*Primary Examiner*—Margaret Medley
*Attorney, Agent, or Firm*—Synnestvedt & Lechner

[57] ABSTRACT

Disclosed is a combustion catalyst system for improving the combustion efficiency of organic liquid fuels, especially those derived from petroleum. The catalyst system comprises a fuel additive comprising from about 18 to about 21 weight percent naphthalene, from about 75 to about 80 weight percent toluene, and from about 2.8 to about 3.2 weight percent benzyl alcohol.

15 Claims, No Drawings

CATALYTICALLY ENHANCED COMBUSTION PROCESS

This is a continuation of application Ser. No. 898,619, filed Aug. 21, 1986 now abandoned.

BACKGROUND OF THE INVENTION

The present invention relates to improvements in the oxidation of liquid fuels. More particularly, the invention relates to combustion catalysts for organic liquid fuels, methods for using the catalysts in the combustion process, and fuels comprising the catalysts.

There has been considerable interest in recent years in developing new fuel additives and combustion catalyst systems for improving the combustion efficiency of gasoline, diesel fuel, and other organic liquid fuels, especially those derived from petroleum. One technique which is often used to measure combustion efficiency is to compare the heat produced to the amount of fuel used. The efficiency of any particular combustion process can also be measured by analyzing the oxidation reaction relative to a "target" reaction. By way of simple example, the complete oxidation of heptane under ideal conditions proceeds according to the following equation:

$$C_7H_{16} + 11O_2 \rightarrow 7CO_2 + 8H_2O + Heat \qquad 1$$

As can be seen from equation 1 above, the idealized complete combustion of a pure hydrocarbon fuel with pure oxygen produces only the reaction products of $CO_2$, $H_2O$ and heat. This can be viewed as a "target" combustion process. A more realistic equation representing the combustion of heptane on a commercial basis is represented by the unbalanced equation below:

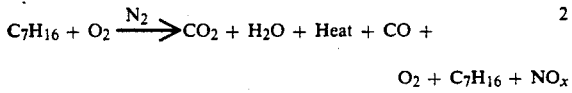

Referring to equation 2 above, the oxidation of heptane actually results in: (a) combustion gases containing CO, residual oxygen, and residual hydrocarbon; (b) heat production which is a fraction of the heat produced by the target combustion process; and (c) the undesirable production of $NO_x$ gas due to the use of air as the source of oxygen for the reaction.

The extent to which actual combustion approaches the reaction described by equation 1 is one measure of combustion efficiency. Accordingly, a desirable and effective combustion catalyst has the characteristics of providing increased energy output per unit of fuel consumed while also causing a reduction of the noxious gases produced in the combustion process. In particular, the amount of energy extractable from a given fuel should be maximized while the formation of hydrocarbon, carbon monoxide, and nitrous oxide emissions should be reduced or eliminated.

It is also highly desirable and advantageous for a combustion system to produce the above mentioned characteristics at a relatively low cost. Accordingly, it is generally desirable for fuel additives or catalysts to be required in only relatively small amounts, for example less than about one part catalyst to 500 parts fuel on a volume basis. In addition, it is greatly preferred that the materials which make up the combustion catalyst or liquid fuel additive have a cost which is a relatively low multiple of the cost of the fuel itself. For example, the materials should preferably have a cost which is no greater than about 3 times the cost of the fuel itself on a weight basis.

As noted above, the actual process of combustion or oxidation is very complex and is believed to proceed via many intermediate chemical species. Accordingly, it is frequently the case that combustion catalysts or liquid fuel additives are known to produce certain results, but the manner in which they function is not clearly understood. It is understood by those skilled in the art, however, that the advantages of and results obtained from any particular additive depend upon the particular combustion apparatus in use, the state of adjustment or repair of the apparatus, carbon build up in the apparatus from prior use, and factors of design. For example, current internal combustion engines are generally of a more efficient design than older models and will accordingly have a lesser potential for improvement in combustion efficiency.

Camphor and naphthalene have been used as gasoline additives to increase the performance of internal combustion engines. While certain improvements have been obtained from these materials, continuous operation of a combustion process using these components in liquid fuels is generally not desirable since they tend to have a severe negative impact on long term, overall combustion efficiency. This negative impact is manifested by increased production of carbon and soot in the process or apparatus.

Attempts have heretofore been made to eliminate the deleterious effects of camphor by providing a fuel oil additive containing both camphor and naphthalene in a mixture with a gasoline fraction, toluene, and benzyl alcohol. See U.S. Pat. No. 3,925,031—Villacampa. In particular, Villacampa discloses a fuel and oil additive which allows the addition of camphor on a continuous basis to a gasoline engine, allegedly without suffering any of the detrimental effects associated therewith. The additive disclosed in the Villacampa reference comprises an additive containing from 16 to 19.5 weight percent naphthalene, 6 to 8.7 weight percent camphor, 28 to 42 weight percent of a gasoline fraction, 36 to 45 weight percent toluene, and 1.0 to 3.0 weight percent benzyl alcohol. A major drawback of this formulation is the requirement of camphor in the composition. While camphor may impart some advantageous characteristics to the fuel additive, it is also generally the most expensive component thereof, often exceeding the cost of the fuel itself by 3000 percent on a weight basis. As a result, the requirement of including camphor as a component in the fuel additive is disadvantageous. In addition, due to the relatively large number of components required by Villacampa, the manufacturing costs associated with such material are relatively high.

SUMMARY OF THE INVENTION

It is an object of the present invention to provide catalysts for enhancing the combustion of liquid fuels such as gasoline, kerosene, diesel fuel and other organic liquid fuels.

Another object of the present invention is to provide methods for combusting liquid fuels to increase the amount of usable energy extractable therefrom and to reduce the amount of noxious gases produced thereby.

Another object of the present invention is to provide a composition which may be added to various organic liquids to reduce the viscosity thereof.

A further object of the present invention is to provide combustion catalysts which are low in cost, simple to produce, and simple to use.

The above and other objects of the present invention are satisfied by providing methods of improving combustion efficiency of a liquid fuel comprising adding to said fuel a combustion catalyst comprising: from about 18 to about 21 weight percent naphthalene, from about 75 to about 80 weight percent toluene, and from about 2.8 to about 3.2 weight percent hydroxy-toluene ("benzyl alcohol").

According to a preferred embodiment of the present invention, the catalyst: liquid fuel volume ratio is between about 1:500 and about 1:3000 on a volume basis.

Another embodiment of the present invention provides a combustion catalyst comprising naphthalene, toluene, and benzyl alcohol, said combustion catalyst having a naphthalene:benzyl alcohol weight ratio of between about 5.6:1 and 7.5:1 and a naphthalene:toluene weight ratio of between about 0.23:1 and 0.26:1.

The present invention provides a combustion process having some or all of the following characteristics:
(1) Negligible carbon monoxide production.
(2) Substantial reduction in $NO_x$ emissions.
(3) Substantial reduction in hydrocarbon emissions.
(4) Negligible carbon build up in the combustion apparatus.
(5) Substantial reduction in the amount of fuel consumed per unit of usable energy.

Another important feature of the present invention is that the above characteristics may be imparted to virtually any liquid fuel by the addition of a small amount of the combustion catalyst disclosed herein. According to the most preferred embodiment of the present invention, the combustion catalyst contains about 19.5 weight percent naphthalene, about 77.5 weight percent toluene, and about 3.0 weight percent benzyl alcohol.

While applicant does not intend to be bound by or to any particular theory, it is believed that the composition of the present invention serves to catalyze the oxidation reaction and thereby achieve the advantageous features of the present invention. In addition, it is believed that the relative proportions of the components which make up the fuel additive are important to this catalytic effect and thereby produce the beneficial results described. In particular, it is most preferred that the catalyst contain naphthalene, toluene, and benzyl alcohol in amounts which produce a naphthalene:benzyl alcohol weight ratio of about 6.5:1 and a naphthalene:toluene weight ratio of about 0.25:1. Accordingly, while slight variations of the proportions disclosed are within the scope of the present invention, these variations will in general tend not to improve the benefits thereof.

It has surprisingly been found that the catalysts of the present invention may also be advantageously used as viscosity reducers for organic liquids. For example, it has been found that the viscosity of the fuel oil described hereinafter in Example 2 may be reduced by between about 200 and 400%, depending upon temperature, by addition of the additive to the fuel oil in an amount sufficient to produce an additive:fuel oil volume ratio of about 1:2000. Accordingly, the additive of the present invention may be effectively and economically used as a drag reducer in large oil pipelines and other processing equipment. It is also possible that the additive may be used to enhance the recovery of crude oil from low production stripper wells. Each of the foregoing uses are easily understood by persons of ordinary skill in the art.

Due to the relative componential simplicity of the catalysts of the present invention, no special procedures are generally necessary for their manufacture. It has been found, however, that the most beneficial results are obtained when the catalyst is formulated as herein described. Although the catalysts of the present invention are generally of a liquid phase, naphthalene is a solid at room temperature and is usually supplied in crystalline or powder form. It is preferred, therefore, to pre-melt the naphthalene by slow heating. Toluene is then mixed with the liquid naphthalene in an amount sufficient to produce a naphthalene:toluene weight ratio in the range of from about 0.23:1 to about 0.25:1. Mixing is continued until a homogeneous solution is obtained. Benzyl alcohol is then preferably added to the homogeneous solution in an amount sufficient to produce a naphthalene:benzyl alcohol weight ratio of from about 5.6:1 to about 7.5:1. The fuel additive is then allowed to stand for at least about 24 hours and preferably for about 72 hours.

In order to achieve a fuel having the features of the present invention with maximum economy, it is preferred that a minimum effective amount of the catalyst be present in the liquid fuel. As will be appreciated by those skilled in the art, this minimum amount will vary according to the type of fuel used, the condition of the combustion apparatus, and other factors. Accordingly, the use of the catalysts in any effective amount that satisfies these parameters is within the scope of the present invention. Applicant has found that in most applications, including liquid fuels used in industrial boilers or internal combustion engines, the catalyst:fuel volume ratio will generally range between about 1:500 and 1:3000.

The catalyst according to the present invention is generally added to the fuel at any time prior to the combustion thereof. It has been found, however, that it may also be possible to co-inject the additive directly into the combustion chamber with the fuel rather than into the fuel itself.

The catalyzed combustion processes of the present invention produce between about 12 and 25% more usable heat per unit of fuel consumed than uncatalyzed combustion. In addition, the carbon monoxide emissions from the catalyzed combustion are about 30% to 100% less than the carbon monoxide emissions from the uncatalyzed combustion process. The catalyzed combustion process also results in a substantial reduction in hydrocarbon and $NO_x$ emissions. All these results indicate that the catalyzed combustion process of the present invention is substantially more efficient than prior uncatalyzed combustion processes.

The following non limiting examples illustrate further the present invention.

EXAMPLE 1

About 18.4 liters, or about 15.95 Kg, of toluene were added to a steam jacketed blending vessel. About 4.0 kilograms of crystalline naphthalene were added to a separate vessel and slowly heated until the naphthalene was liquefied. The liquid naphthalene was then added to the toluene to produce a naphthalene:toluene weight ratio of about 0.25. The mixture was stirred until a homogeneous solution was obtained. About 0.6 liters, or about 0.62 Kg, of benzyl alcohol were then added to the homogeneous solution to produce a naphthalene:benzyl alcohol weight ratio of about 6.45. The solution was then allowed to stand for 72 hours before use.

EXAMPLE 2

A combustion test was carried out with a Burner Model No. P-26 manufactured, supplied, and tuned by the firm of Cenit SA. The burner was installed in a Burner's Test Chamber No. 0400 (hereinafter "the Test Chamber"), built in accordance with the European Burner's Committee norms. The Test Chamber contained a series of cooling water circuits which were used to make calorimetric measurements and to determine the amount of usable heat contained in the fuel. The Test Chamber also contained a series of peepholes through which the flame temperature of the burner fuel was pyrometrically measured. A series of tests using the Test Chamber were carried out using a fuel oil having the following properties:

| Property | Measuring Method | Value |
| --- | --- | --- |
| Sp. Gr. @ 15° C. | (ASTM D-1298) | 0.9544 |
| Sulfur, wt. % | (ASTM D-1552) | 2.25 |
| Engler Viscosity | (INTA-150218A) | 18.23 |
| Flash Point, °C. | (ASTM D-93) | 100° C. |
| Fluidity @ 0° C. | (ASTM D-1659) | no flow |
| Ramsbottom coke, wt. % | (ASTM D-524) | 6.56 |
| Water & Sediment, wt. % | (ASTM D-1796) | 0.6 |

The fuel described above was charged to the Test Chamber described above at a rate of about 21.82 Kg/Hr. Table 1 below lists the average value of the $CO_2$ and the noxious gas content in the flue gas produced in this test.

TABLE 1

| Flue Gas Composition | |
| --- | --- |
| $CO_2$, mole % | 11 |
| CO, mole % | 0.26 |
| Hydrocarbons, Vol. % | 2.3 |
| $NO_x$, mg/m$^3$ | 40 |

Based upon the calorimetric measurements taken during the test run, the average usable heat production was calculated to be 148.77 kilocalories per hour or 6.82 kilocalories per kilogram of fuel. As the term is used in these examples, the usable heat production refers to the total amount of heat absorbed by the cooling circuits in the Test Chamber.

Based upon pyrometric measurements taken through the peephole closest to the burner, the flame temperature of the fuel was approximately 1120° C.

EXAMPLE 3

A stock solution of the combustion catalyst prepared in accordance with Example 1 was mixed with the fuel oil described in Example 2 in an amount sufficient to produce a catalyst:fuel volume ratio of 1:2000.

The fuel was then charged to the Test Chamber at a rate of 21 Kg/Hr. under conditions which were essentially identical to those of Example 2. Table 2 lists the average value of the $CO_2$ and the noxious gas content of the flue gas.

TABLE 2

| Flue Gas Composition | |
| --- | --- |
| $CO_2$, mole % | 10 |
| CO, mole % | 0.08 |
| Hydrocarbons, Vol. % | 1.6 |
| $NO_x$, mg/m$^3$ | 12.6 |

Based upon the calorimetric measurements, the average usable heat production was calculated to be 183.11 kilocalories per hour or 8.72 kilocalories per kilogram of fuel.

A comparison of Example 2 with Example 3 reveals a 24.8% increase in the usable combustion heat available when the catalyst is used. CO emissions were also reduced by about 30 relative percent. In addition, the combustion catalyst of the present invention allowed a more complete combustion of the fuel and hence substantial reduction in the hydrocarbon from the exhaust gas. $NO_x$ emissions were also drastically reduced, i.e., by 69 relative percent. Based upon pyrometric measurements, the flame temperature at the peephole closest to the burner increased by about 4% to about 1167° C.

EXAMPLE 4

The procedure of Example 3 was repeated except that the fuel was charged at a rate of 22.76 Kg/Hr. and the Test Chamber was adjusted so as to produce flue gases containing approximately 11% $CO_2$, the value found in comparative Example 2. Table 3 indicates the average values of the $CO_2$ and CO in the flue gas.

TABLE 3

| Flue Gas Composition | |
| --- | --- |
| $CO_2$, mole % | 11.1 |
| CO, mole % | 0 |

Based upon the calorimetric measurements, it was calculated that the average amount of usable heat produced was 193.76 kilocalories per hour or 8.51 kilocalories per kilogram of fuel.

A comparison of Example 4 with Example 2 reveals an improvement of approximately 25% in the amount of usable combustion heat per unit mass of fuel at a $CO_2$ level comparable to Example 2. In addition, the combustion catalyst of Example 1 allowed a more complete combustion of the fuel and hence the substantial elimination of CO from the exhaust gas. Based upon pyrometric measurements, the flame temperature at the lowest peephole increased by about 3% to about 1152° C.

EXAMPLE 5

The procedure of Example 4 was repeated except that an inadvertent adjustment of the Test Chamber produced flue gases containing an increased concentration of $CO_2$, approximately 11.5 mole percent. Table 4 indicates the average values of $CO_2$ and CO in the flue gas.

TABLE 4

| Flue Gas Composition | |
| --- | --- |
| $CO_2$, mole % | 11.7 |
| CO, mole % | .30 |

The average amount of usable heat produced in the furnace was calculated to be 183.8 kilocalories per hour or 8.08 kilocalories per kilogram of fuel.

A comparison of Example 5 with Example 2 reveals an improvement of approximately 18% in the amount of usable combustion heat per unit mass of fuel despite the maladjusted Test Chamber. Based upon pyrometric measurements, the flame temperature at the lowest peephole decreased about 2% to about 1100° C.

EXAMPLE 6

A calorimetric combustion test of the fuel oil described in Example 2 was performed by the Laboratory of Inorganic Chemistry located at The University of Madrid. The upper heating value of the fuel was found to be 10.47 Kcal/Kg. The upper heating value of the fuel/catalyst mixture described in Example 3 was measured by the same Laboratory of Inorganic Chemistry according to the same technique and was found to have a value of 10.64 kcal/Kg. This indicates that when the catalyst of the present invention is added to the fuel described in Example 2, the upper heating value of the fuel is increased by approximately 1.6 relative percent.

It should be noted that the result obtained from the test of Example 5 is consistent with the results obtained from the tests of Examples 3 and 4. That is, the usable heat increase of about 25% obtained in Examples 3 and 4 is believed to have resulted, in part, from the fact that the heat was available at a higher temperature. For example, the flame temperature of the uncatalyzed fuel of Example 2, as measured through the peep hole closest to the burner, was on the average 1120° C. For the catalyzed fuel of Example 3, the same measurement techniques indicated a flame temperature of about 1167° C. In Example 4, the measured flame temperature was 1152° C. In each case, the flame temperature of the catalytically enhanced combustion was substantially higher than the uncatalyzed reaction. This increased flame temperature permits a more thermodynamically efficient transfer of heat from the combustion gases.

EXAMPLE 7

A series of comparative combustion tests using a number one fuel oil both with and without the combustion catalyst of the present invention were performed.

The testing apparatus consisted of a hot gas generator divided into two sections. The first section, which comprised the combustion chamber, contained a burner Model No. PCA175 manufactured by Cuendod. The combustion chamber consisted of fire brick which was cooled on the outside by a constant amount of cooling air. After passing over the fire brick, the cooling air was injected into the combustion gases produced by the burner. The cooling air/combustion gases mixture was then injected into the second section of the hot gases generator. A predetermined amount of dilution air was also introduced into the second section where it mixed with the combustion gases and the cooling air. This mixture then passed into a chimney and from the chimney into a system of flue gas purification.

Uncatalyzed fuel oil was charged to the testing apparatus at a rate of about 105.9 Kg/Hr for about 5.7 hours. The flow of both cooling and dilution air were held constant over the period of the test. The percentage of $CO_2$ and hydrocarbon in the flue gas was maintained at a constant value. During the test, the temperature of the air entering the combustion chamber was measured by a digital thermometer. The temperature of the flue gases exiting the combustion chamber was also measured. For the fuel oil without the combustion catalyst, the average difference between these two temperatures over the course of the test was 350.4° C.

An identical test to the one described above was then performed using the same fuel having the combustion catalyst prepared in accordance with Example 1 added in an amount sufficient to produce a catalyst:fuel volume ratio of 1:1250. The average temperature difference between the flue gases exiting the chimney and the incoming air to the combustion chamber was measured to be about 392° C. Assuming the same heat capacity for the combustion gases in both cases, this represents about a 17% increase in the amount of heat produced in the catalyzed combustion process relative to the uncatalyzed test.

The temperature of the flame was pyrometrically measured for the both tests. No measurable variation in the flame temperature was noted for the catalyzed combustion when compared to the uncatalyzed combustion.

EXAMPLE 8

A two year old Scania truck having a diesel engine was field tested. The average fuel consumption for the life of the truck up to the time of the start of the test was 0.3388 liters per kilometer. The average fuel consumption of the truck over the 52 weeks immediately prior to the start of the test was 0.3363 liters per kilometer. The truck was then driven an average of 400 kilometers per day for four weeks using diesel fuel containing the catalyst prepared according to the method described in Example 1. The catalyst was added to the diesel fuel in an amount sufficient to produce a catalyst:fuel volume ratio of about 1:1000. The average fuel consumption over the four week period of the test was measured to be 0.2907 liters per kilometers. This represents a 13.6% increase in fuel economy.

A three year old Scania diesel truck was also tested. The average fuel economy over the life of the truck prior to the test was 0.3309 liters per kilometer. The average fuel consumption over the 52 weeks immediately prior to the beginning of the test was 0.33 liters per kilometer. The three year old truck was run an average of 400 kilometers per day for four weeks using a catalyzed diesel fuel made according to the same procedure used for the two year old Scania truck. The average fuel economy over the four week testing period was measured to be 0.2765 liters per kilometer, which represents approximately a 16.2 percent increase in fuel economy.

EXAMPLE 9

A field test was carried out for a three month period using the combustion catalyst prepared in accordance with Example 1 in the diesel fuel used by five buses owned and operated by The Isle of Man Passenger Transportation Board. The catalyst was added to the diesel fuel in an amount sufficient to produce an catalyst:fuel volume ratio of about 1:1000.

When compared to the fuel consumption of the five trucks for the 12 month period immediately preceding the test, the average fuel consumption was reduced about 12.7%. The Isle of Man Transportation Board reported observing a substantial reduction in the emission of exhaust fumes.

A second field test was carried out for an 18 month period using the entire fleet of 79 buses owned and operated by the Isle of Man Transportation Board. The Isle of Man Transportation Board reported an overall reduction of fuel consumption of about 12% and no noticeable negative side effects.

In both field tests, the combustion catalyst was added to the diesel fuel without disclosing the composition of the catalyst or the amount of the catalyst added.

EXAMPLE 10

A test was carried out with ten gasoline powered automobiles of various makes. Each automobile in the test was operated over a 300 kilometer course at a constant speed of 90 kilometers per hour using normal untreated gasoline. Each vehicle then repeated the same course at the same speed under the same weather and road conditions using catalyzed gasoline. The catalyst was prepared in accordance with the procedure of Example 1 and was added in an amount sufficient to produce a catalyst:gasoline volume ratio of 1:1000. Every test car showed an improvement in fuel economy over the 300 kilometer course. The average reduction in fuel consumption for all test vehicles was about 14.6%.

What is claimed is:

1. A method for catalytically enhancing the combustion of petroleum based liquid hydrocarbon fuel, said method comprising adding to the liquid fuel a catalyst comprising:
   (a) from about 18 to about 21 weight percent naphthalene;
   (b) from about 75 to about 80 weight percent toluene; and
   (c) from about 2.8 to about 3.2 weight percent benzyl alcohol.

2. The method of claim 1 wherein said catalyst is added in an amount sufficient to produce a catalyst:liquid fuel volume ratio of greater than about 1:3000.

3. The method of claim 1 wherein said catalyst is added in an amount sufficient to produce a catalyst liquid fuel volume ratio of between about 1:3000 and 1:500.

4. The method of claim 1 wherein said liquid hydrocarbon fuel is selected from the group consisting of fuel oil, diesel fuel, kerosene, and gasoline.

5. A combustion catalyst for petroleum based liquid hydrocarbon fuel comprising naphthalene, toluene, and benzyl alcohol, said catalyst having a naphthalene:benzyl alcohol weight ratio of between about 5.6:1 and about 7.5:1 and a naphthalene:toluene weight ratio of between about 0.23:1 and about 0.26:1.

6. The catalyst of claim 5 comprising naphthalene and benzyl alcohol in a weight ratio of about 6.5:1.

7. The catalyst of claim 6 comprising naphthalene and toluene in a weight ratio of about 0.25:1.

8. The catalyst of claim 5 comprising naphthalene and toluene in a weight ratio of about 0.25:1.

9. A fuel having improved combustion efficiency comprising:
   (a) a petroleum based liquid hydrocarbon; and
   (b) a combustion catalyst comprising from about 18 to about 21 weight percent naphthalene, from about 75 to about 80 weight percent toluene, and from about 2.8 to about 3.2 weight percent benzyl alcohol, said catalyst:liquid hydrocarbon volume ratio being between about 1:3,000 and 1:500.

10. The fuel of claim 9 wherein said liquid hydrocarbon is selected from the group consisting of fuel oil, diesel fuel, kerosene, and gasoline.

11. The composition of claim 9 wherein said catalyst:liquid hydrocarbon volume ratio is between about 1:2000 and 1:1000.

12. The method of claim 1 wherein said catalyst consists essentially of naphthalene, toluene and benzyl alcohol.

13. The combustion catalyst of claim 5 wherein said catalyst consists essentially of naphthalene, toluene and benzyl alcohol.

14. The combustion catalyst of claim 13 wherein:
   (a) naphthalene is present in an amount from about 18 to about 21 weight percent;
   (b) toluene is present in an amount from about 75 to about 80 weight percent; and
   (c) benzyl alcohol is present from about 2.8 to about 3.2 weight percent.

15. The fuel of claim 9 wherein said combustion catalyst consists essentially of naphthalene, toluene and benzyl alcohol.

* * * * *